United States Patent [19]
Matsuura

[11] Patent Number: 5,241,485
[45] Date of Patent: Aug. 31, 1993

[54] NONCONTACT TRACING CONTROL SYSTEM
[75] Inventor: Hitoshi Matsuura, Hachioji, Japan
[73] Assignee: Fanuc Ltd., Minamitsuru, Japan
[21] Appl. No.: 689,933
[22] PCT Filed: Sep. 21, 1991
[86] PCT No.: PCT/JP90/01226
  § 371 Date: May 22, 1991
  § 102(e) Date: May 22, 1991
[87] PCT Pub. No.: WO91/04833
  PCT Pub. Date: Apr. 18, 1991
[30] Foreign Application Priority Data
  Oct. 4, 1989 [JP] Japan ............... 1-259824
[51] Int. Cl.⁵ .............. G06F 15/46; B23Q 35/127
[52] U.S. Cl. .............. 364/474.03; 318/578; 318/579
[58] Field of Search ......... 364/474.03, 474.28, 364/474.37; 318/577, 578, 579, 571

[56] References Cited
U.S. PATENT DOCUMENTS 4,962,460 10/1990 Matsuura ............... 364/474.03
4,999,555 3/1991 Yamazaki et al. ............ 318/578
5,019,993 5/1991 Montalcini et al. ........... 364/474.29
5,067,086 11/1991 Yamazaki et al. ............ 364/474.08
5,140,239 8/1992 Matsuura ..................... 318/577

OTHER PUBLICATIONS

EP-A-0 313 801 (Advanced Data Processing ADP S.R.L.) 3 May 1989, col. 3, line 26–col. 5, line 21, FIGS. 1–5, Patent Application.

Primary Examiner—Jerry Smith
Assistant Examiner—Paul Gordon
Attorney, Agent, or Firm—Staas & Halsey

[57] ABSTRACT

A noncontact tracing control system for machining or digitizing a workpiece through tracing the shape of a model without a contact therewith. Coordinate values of each vertex of a micro quadrangle on a model surface (6) are obtained from measured values at the previous sampling and the present sampling from two noncontact distance detectors (5a, 5b), a normal direction is obtained using the coordinate values of three necessary vertexes thereof, and the rotation of two axes (B1, C1) of a tracer head (4) is controlled in this direction. Accordingly, optical measuring axes of the noncontact distance detectors are always at a right angle to the model surface, which enables a distance measuring with a high accuracy.

4 Claims, 4 Drawing Sheets

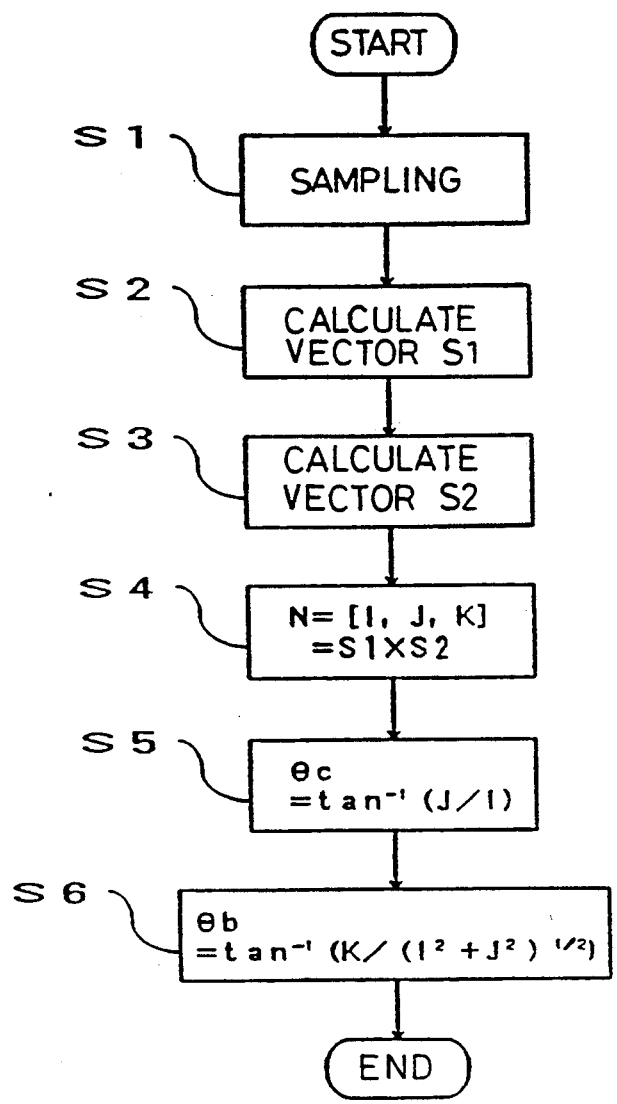
F I G. 4

NONCONTACT TRACING CONTROL SYSTEM

TECHNICAL FIELD

The present invention relates to a noncontact tracing control system, and more particularly, to a noncontact tracing control system using distance detectors having a high measuring accuracy.

BACKGROUND ART

Recently, a noncontact tracing control system using a noncontact distance detector as a tracer head has been developed, and, for example, an optical distance detector is used for this noncontact distance detector, and a model is traced by using this detector to detect the distance to the model surface. This system eliminates fears of damage to the model, and therefore, a soft material can be used for a model, which will enable a wider applicability thereof for machining and digitizing.

The conventional noncontact tracing control system, however, has a problem in that the tracing accuracy is lowered at portions of a model where an inclination thereof is large. Namely, at this portion, an optical measuring axis of a distance detector is not at a right angle to the model surface, and accordingly, the spot of light on the model surface is distorted into the shape of an ellipse, and thus the resolution of the distance detector is lowered and the tracing accuracy becomes low. Particularly, for a trigonometrical distance detector, a measurement sometimes becomes impossible because the optical measuring axis interferes with the model surface due to the angle thereof.

To solve this problem, the applicant filed a Patent Application No. 1-194500, entitled "NONCONTACT TRACING CONTROL SYSTEM", on Jul. 27, 1989. In Patent Application No. 1-194500, tracing accuracy is improved by acquiring a normal vector of a model surface based on measured values of a sampling taken at this time and at the previous time by two noncontact distance detectors of a tracer head, and by controlling the rotation of the tracer head in the direction of the projection of this normal vector when projected on a predetermined plane, to thereby carry out a distance measuring with a high accuracy.

Nevertheless, the optical measuring axis of the noncontact distance detector cannot be made to perfectly conform to the normal direction, depending on an inclination of the model surface, and thus in some cases, the measuring accuracy cannot be improved as much as expected.

DISCLOSURE OF THE INVENTION

The present invention has been made in view of the aforesaid drawbacks, and an object of the present invention is to provide a noncontact tracing control system having an improved tracing accuracy by obtaining measured values with a higher accuracy from noncontact distance detectors.

To achieve the above object, in accordance with the present invention there is provided a noncontact tracing control system for machining or digitizing a workpiece through tracing the shape of a model without a contact therewith, comprising first and second noncontact distance detectors, in which the inclinations of the measuring axes are controlled to be identical, respectively, by first and second rotation axes having centers which cross each other, for measuring the distance to the above model surface without a contact therewith, a sampling means for sampling measured values of each of the above first and the second noncontact distance detectors at predetermined sampling times, a storing means for storing a first measured value of the above first noncontact distance detector and a second measured value of the above second noncontact distance detector at the previous sampling, a normal direction calculating means for acquiring a normal direction of the above model surface using at least three measured values of the above first and second measured values, a third measured value of the above first noncontact distance detector and a fourth measured value of the above second noncontact distance detector of the present sampling, and a rotation axis drive means for rotating the above first and the second rotation axes in the normal direction calculated as above.

A coordinate value of each vertex of a micro quadrangle on the model surface is obtained from the measured values at the sampling of the previous time and the present time from two noncontact distance detectors, and a normal direction is acquired using three necessary vertex coordinate values thereof to control the rotation of two axes of the tracer head in this direction. Accordingly, the optical measuring axis of the noncontact distance detector is always at a right angle to the model surface, and thus a distance measuring with a high accuracy can be obtained.

BRIEF DESCRIPTION OF THE DRAWINGS

FIG. 4 is a flow chart of a calculation processing of a rotation command in an embodiment of the present invention.

BEST MODE OF CARRYING OUT THE INVENTION

An embodiment of the present invention will hereinafter be described with reference to the drawings.

Figure 1:
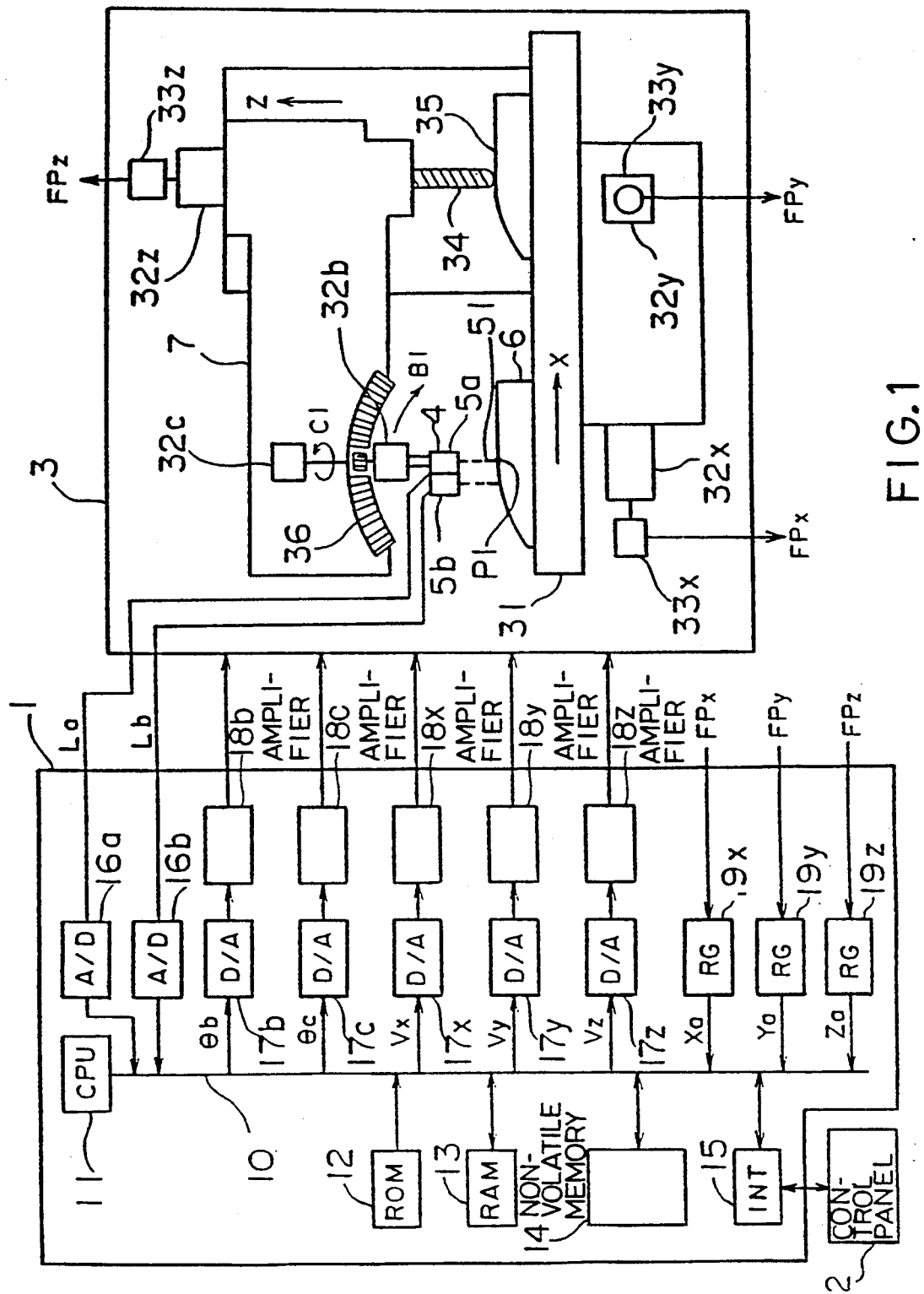
FIG. 1 is a block diagram showing the constitution of a noncontact tracing control system according to an embodiment of the present invention.

FIG. 1 is a block diagram showing a noncontact tracing control system and the peripheral constitution thereof according to the present invention. In FIG. 1, a processor 11 reads a system program stored in a ROM 12, through a bus 10, and controls the overall operation of a tracing control system 1 according to this system program. A RAM 13 is used as a data temporary storing device and stores measured values from distance detectors, which will be described later, and other temporary data. A nonvolatile memory 14 is constituted by a CMOS backed up by a battery, and stores various parameters such as a tracing direction and tracing speed, etc. input from a control panel 2 through an interface 15.

A tracer head 4 of a tracing machine 3 is constituted by distance detectors 5a and 5b. A reflected light amount type distance detector using a semiconductor laser or a light emitting diode as a light source is used for the distance detectors 5a and 5b, each of which measures a distance to a model 6 without a contact therewith. Measured values La and Lb of these distance detectors are digital converted by A/D converters 16a and 16b in the tracing control system 1, and sequentially read by the processor 11.

The processor 11 calculates displacement amounts of each axis based on the measured values La and Lb and signals from current position registers 19x, 19y, and 19z and generates speed commands Vx, Vy, and Vz of the respective axes based on these amounts of displacement, and commanded tracing direction and tracing speed, according to the known process. These speed commands are analog converted by D/A converters 17x, 17y, and 17z and input to servo amplifiers 18x, 18y, and 18z. The servo amplifiers 18x and 18y drive servomotors 32x and 32y of the tracing machine 3 based on these speed commands, to thereby move a table 31 in the X-axis direction and the Y-axis direction at right angles to the sheet surface. Also, the servo amplifier 18z drives the servomotor 32z, and a column 7 is moved in the Z-axis direction to maintain a constant distance between the distance detector 5a and the model 6, as mentioned later.

Pulse coders 33x, 33y, and 33z are provided in these servomotors 32x, 32y, and 32z for generating pulses FPx, FPy, and FPz at a predetermined amount of rotation of these servomotors. The current position registers 19z, 19y, and 19z store current position data Xa, Ya, and Za in each axial direction by counting up/down the detection pulses FPx, FPy, and FPz according to the respective rotation direction, and input the data to the processor 11.

At the same time, the processor 11 samples the measured values La and Lb of the distance detectors 5a and 5b at predetermined sampling times, while simultaneously controlling the above axes, acquires a normal vector on the model 6 using this sampling data, and generates a rotation command $\theta c$ in the direction of an angle of a projection of the normal vector on the X-Y plane and a rotation command $\theta b$ in the direction of an angle of the normal vector against the X-Y plane. The rotation commands $\theta c$ and $\theta b$ are analog converted by D/A converters 17c and 17b, respectively, and input to servo amplifiers 18c and 18b. The servo amplifier 18c drives a servomotor 32c and the servo amplifier 18b drives a servomotor 32b.

When the servomotor 32b is driven, the tracer head 4 is rotated in the B1 axis direction, with the rotation center of a measured point P1 being at a measuring axis 51, a predetermined distance from the distance detector 5a, through a drive mechanism 36 constituted by a pinion gear and an arc-shaped rack gear. Also, when the servomotor 32c is driven to rotate in the C1 axis direction, with the measuring axis 51 of the distance detector 32c as the center, by the drive mechansim 36, the distance detector 5b is rotated by the same angle of the circumference of a predetermined radius. During this rotation, a point P1 (intersection of the centers of the C1 and the B1 axes) is controlled to be constantly positioned on the surface of the model 6, by the above-mentioned Z-axis control, and at the same time, the table 31 is moved in the commanded tracing direction at the commanded speed to enable a workpiece 35 to be machined to the same shape as that of the model 6, by a cutter 34 attached to the column 7.

Figure 2:
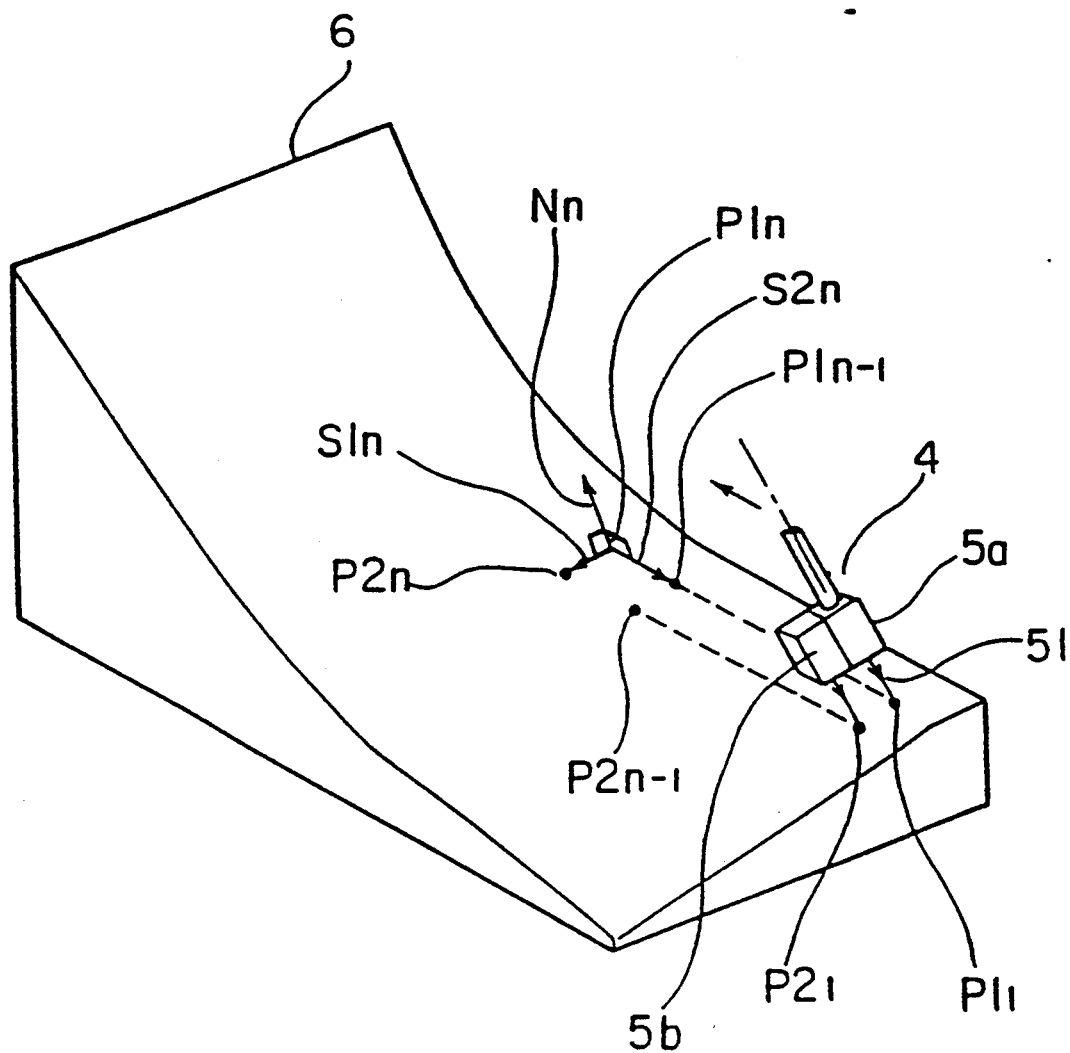
FIGS. 2 and 2A are explanatory views of a calculation method of a rotation command in an embodiment of the present invention.
Figure 2A:
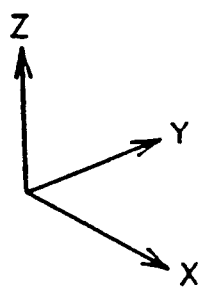
Figure 3:
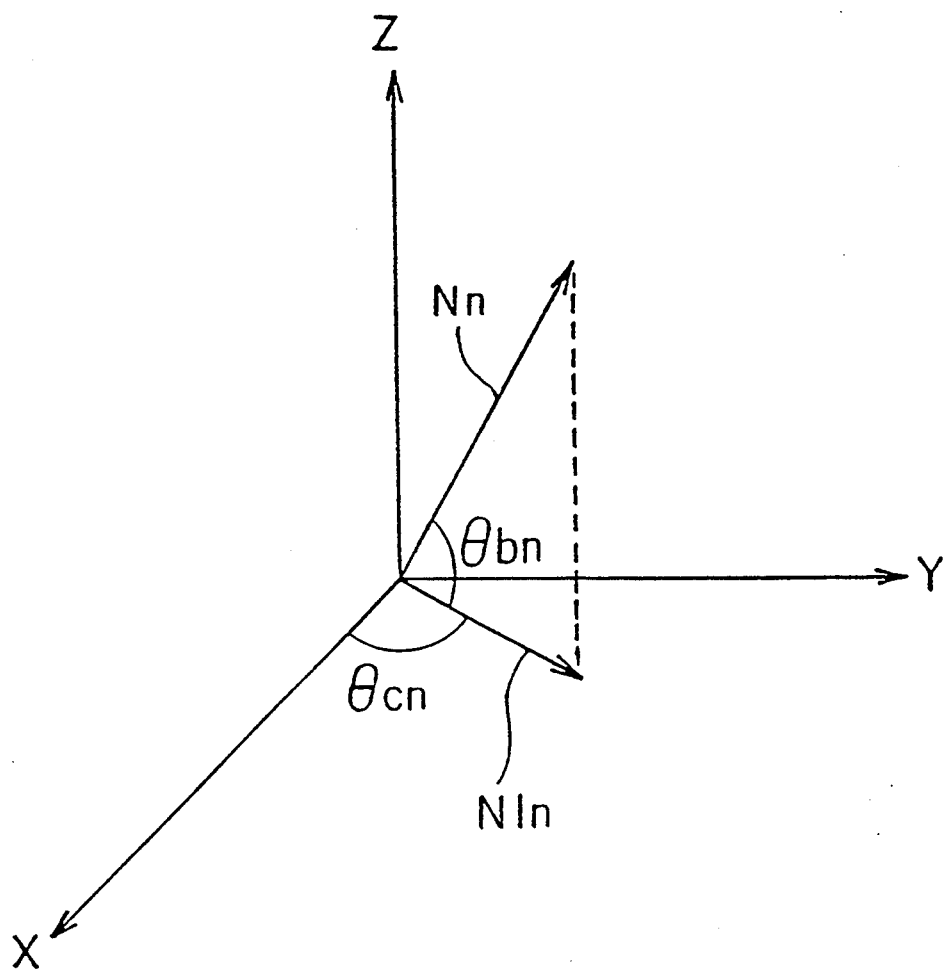
FIG. 3 is an illustration showing an angle of a normal vector in an embodiment of the present invention.

Next, the obtaining of the rotation commands $\theta c$ and $\theta b$ will be explained. In FIG. 2, the tracing is carried out by moving the tracer head 4 in the X-axis direction relative to the model 6 and at a predetermined speed, the measured values of the distance detectors 5a and 5b are sampled at predetermined times, and coordinate values of points $P1_1, \ldots P1_{n-1}, P1_n,$ and $P2_1, \ldots P2_{n-1}, P2_n$ on the model 6 are obtained based on these measured values and the current position data output from the current position registers.

Further, for example, a surface vector S1n $[X2_n\text{-}X1_n, Y2_n\text{-}Y1_n, Z2_n\text{-}Z1_n]$ is obtained from the coordinate value of the point $P1_n$ $(X1_n, Y1_n, Z1_n)$ and the coordinate value of the point $P2_n$ $(X2_n, Y2_n, Z2_n)$, and a surface vector S2n $[X1_{n-1}\text{-}X1_n, Y1_{n-1}\text{-}Y1_n, Z1_{n-1}\text{-}Z1_n]$ is obtained from the coordinate value of the point $P1_n$ $(X1_n, Y1_n, Z1_n)$ and the coordinate value of the point $P1_{n-1}$ $(X1_{n-1}, Y1_{n-1}, Z1_{n-1})$.

Next, a normal vector Nn at the point Pn is obtained by deriving an outer product of the surface vectors S1n and S2n from the following equation:

$$Nn = S1n \times S2n \tag{1}$$

(where Nn, S1n, and S2n are vectors)

Then, an angle $\theta cn$ between the X-axis and a projection N1n of the normal vector Nn project on the X-Y plane is obtained by the following equation, and the angle $\theta cn$ is output as a command value for the C1 axis:

$$\theta cn = \tan^{-1}(Jn/In) \tag{2}$$

where
In: X component of the vector Nn;
Jn: Y component of the vector Nn.

Also, an angle $\theta bn$ between the normal vector Nn and the X-Y plane is obtained by the following equation, and this angle $\theta bn$ is output as a command value for the B1 axis:

$$\theta bn = \tan^{-1}(Kn/(In^2+Jn^2)^{\frac{1}{2}}) \tag{3}$$

where Kn: Z component of the vector Nn.

As a result, the measuring axes of the distance detectors 5a and 5b are always at a right angle to the surface of the model 6, and thus a distance measuring having a high accuracy is obtained.

FIG. 4 is a flow chart of a calculation processing of the rotation commands in an embodiment according to the present invention. In FIG. 4, the numerical values following the letter S show step numbers.

[S1] The measured values of the distance detectors 5a and 5b are sampled at predetermined times.

[S2] The surface vector S1 is obtained from the measured values of the respective distance detectors at the present time.

[S3] The surface vector S2 is obtained from the measured values of the distance detector 5a, at the present time and at the previous time.

[S4] The normal vector N is obtained by deriving an outer product of the surface vector S1 and the surface vector S2.

[S5] The angle $\theta c$ between the X-axis and the projection of the normal vector N projected on the X-Y plane is calculated.

[S6] The angle $\theta b$ between the normal vector N and the X-Y plane is calculated.

Note, the normal vector was obtained based on the measured value of one of the distance detectors at the previous sampling and the measured values of both of the distance detectors at the present sampling in the above embodiment, but this is not limited thereto in that the normal direction can be also obtained from at least three points by other combinations of the four measured values obtained by sampling at the present time and at the previous time.

Also, other than reflected light amount type of detector, an optical trigonometrical type, eddy-current type, or ultrasonic type distance detector can be used as the distance detector.

Note, as a cutter has a radius but a noncontact sensor measures a "point" on a model, there is no guarantee that the same point as the measured point will be cut, but if the cutter diameter is small enough, the difference between the measured point and the cutting point can be ignored.

On the other hand, for the digitizing, the whole shape of a model can be reproduced as numerical data by obtaining successive points on the model, and thus a tracing control system using a noncontact sensor has a greater effect when applied to a digitizing system.

According to the present invention as described above, a normal direction on a model surface is obtained based on measured values from two noncontact distance detectors at the previous sampling and the present sampling and the rotation of a tracer head is controlled in this direction, and therefore, the measuring axes of the noncontact distance detectors are always at a right angle to the model surface, which enables a distance measuring with a high accuracy and improves tracing accuracy. Also, as no blind spot is generated due to interference with the model surface, a complicated three-dimensional model can be traced.

I claim:

1. A noncontact tracing control system for machining or digitizing a workpiece through tracing a shape of a model without contact therewith, comprising:

first and second noncontact distance detectors, whereof inclinations of measuring axes are controlled to be in a parallel side-by-side manner, respectively, by first and second rotation axes having centers which cross each other, for measuring the distance to said model surface without a contact therewith;

a sampling means for sampling measured values of each of said first and second noncontact distance detectors at predetermined sampling times;

a storing means for storing a first measured value of said first noncontact distance detector and a second measured value of said second noncontact distance detector at the previous sampling;

a normal direction calculating means for obtaining a normal direction of said model surface using at least three measured values of any of said first and second measured values, a third measured value of said first noncontact distance detector and a fourth measured value of said second noncontact distance detector of the present sampling; and a rotation axis drive means for rotating said first and second rotation axes in the normal direction calculated above.

2. A noncontact tracing control system according to claim 1, wherein said tracing machining or digitizing is executed by calculating a displacement amount based on measured values of at least one of said first and second noncontact distance detectors.

3. A noncontact tracing control system according to claim 1, wherein said normal direction calculating means calculates said normal direction by obtaining coordinate values of three points on said model surface using said three measured values, by obtaining first and second vectors heading from one point of said three coordinate values to the other two points, and by operating a vector product between said first and second vectors.

4. A noncontact tracing control system according to claim 1, wherein said first and second noncontact distance detectors are optical distance detectors.

* * * * *